July 22, 1958 V. E. MATULAITIS 2,844,085
AIR DISTRIBUTION SYSTEM
Original Filed July 28, 1949 3 Sheets-Sheet 1
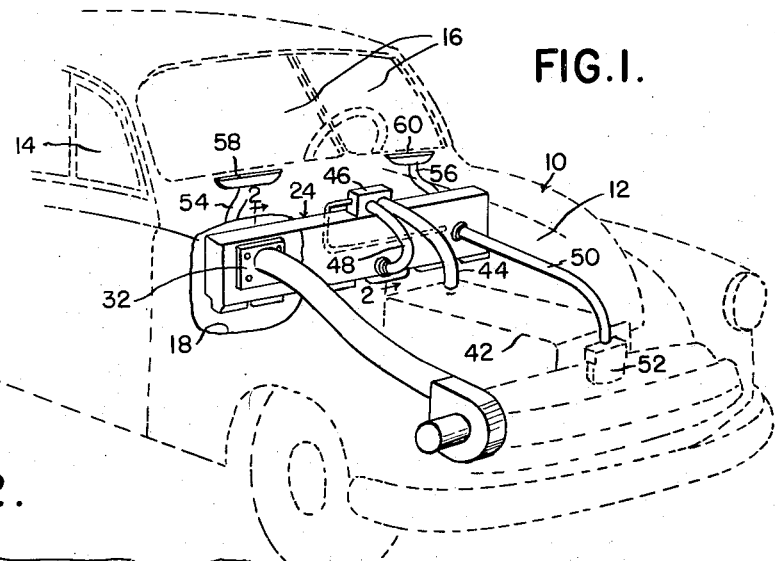
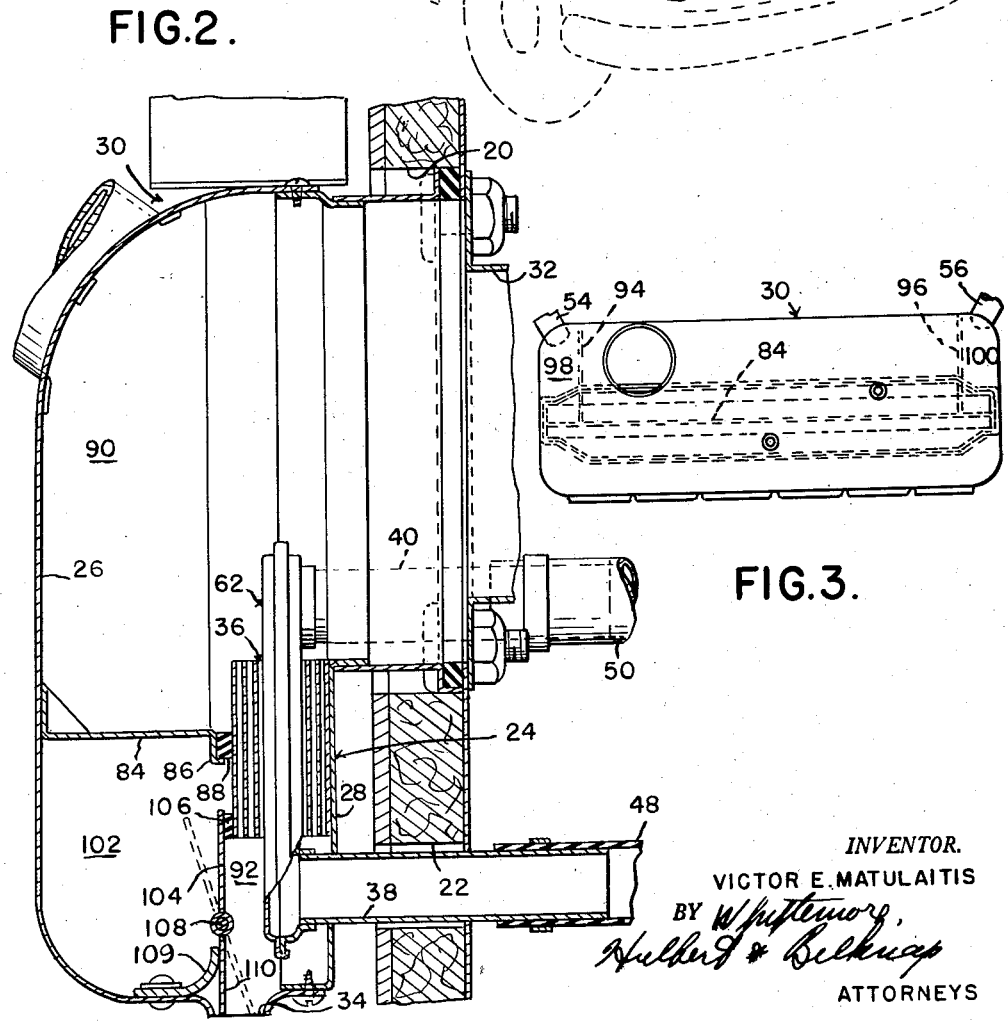
INVENTOR.
VICTOR E. MATULAITIS
BY
ATTORNEYS July 22, 1958 V. E. MATULAITIS 2,844,085
AIR DISTRIBUTION SYSTEM
Original Filed July 28, 1949 3 Sheets-Sheet 2
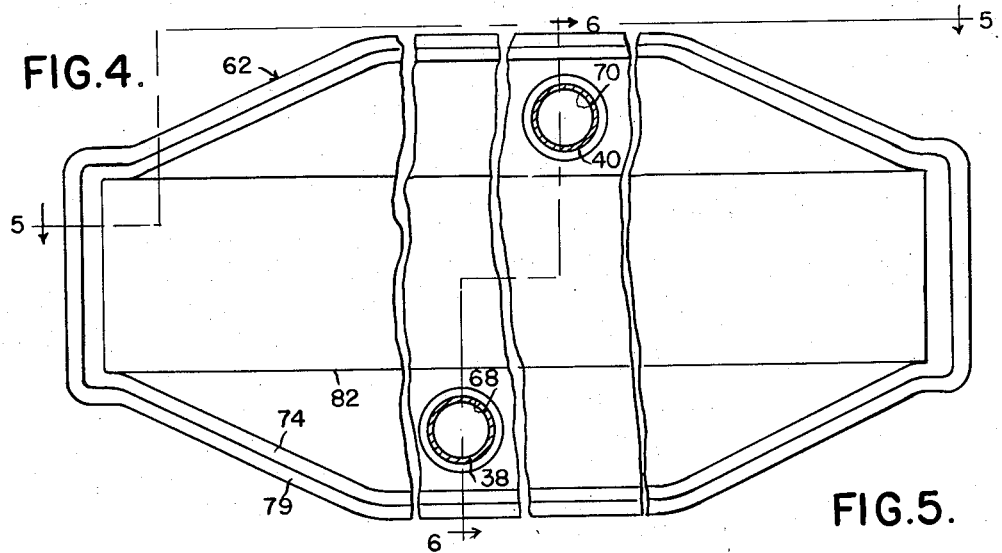
FIG.4.
FIG.5.
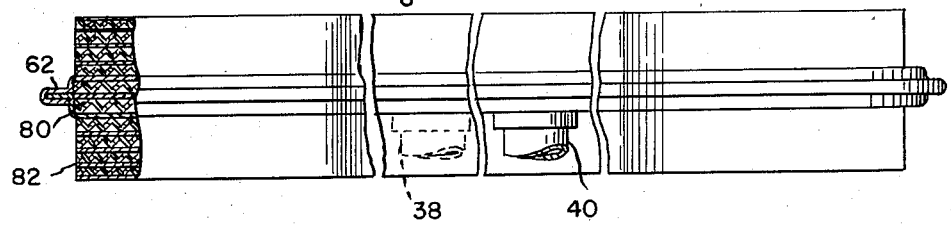
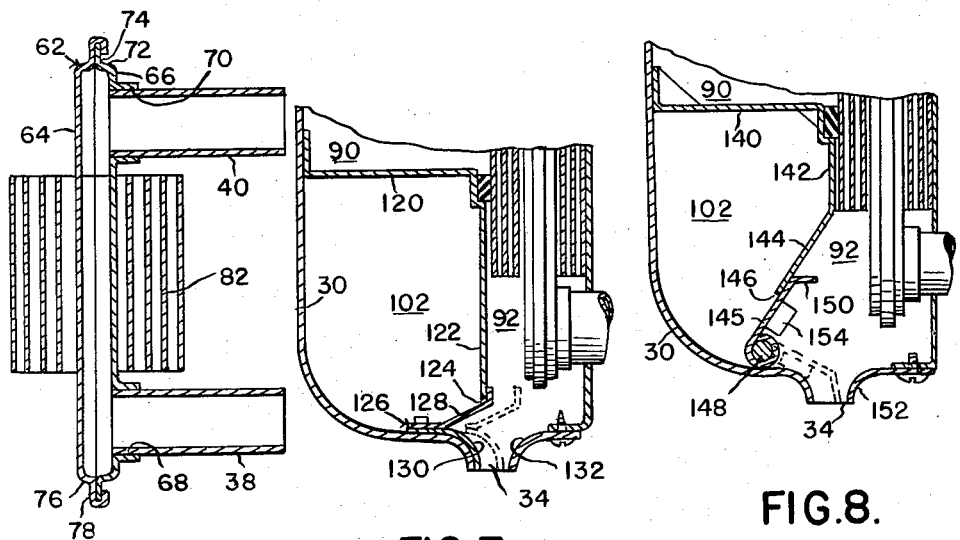
FIG.6.
FIG.7.
FIG.8.
INVENTOR.
VICTOR E. MATULAITIS
ATTORNEYS July 22, 1958 V. E. MATULAITIS 2,844,085
AIR DISTRIBUTION SYSTEM
Original Filed July 28, 1949 3 Sheets-Sheet 3
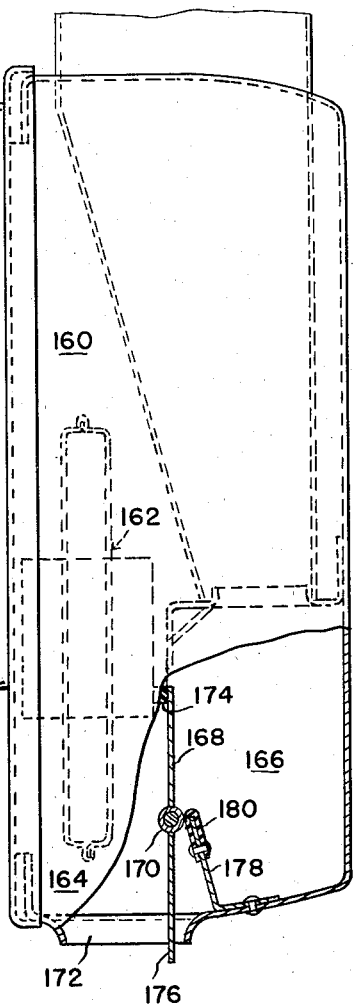
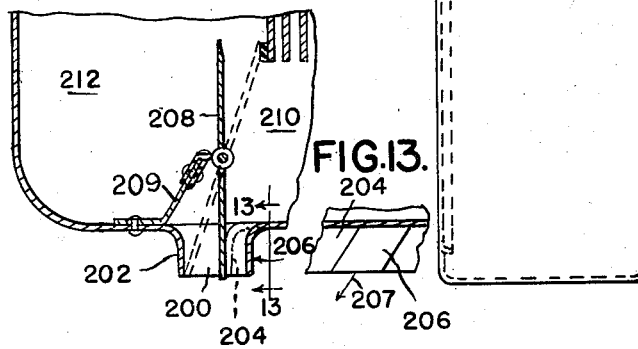
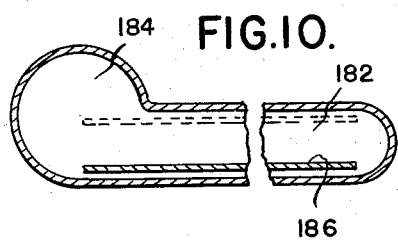
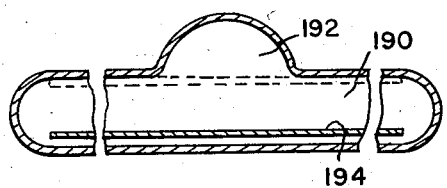
INVENTOR.
VICTOR E. MATULAITIS
BY Whittemore,
Hulbert & Belknap
ATTORNEYS

United States Patent Office 2,844,085
Patented July 22, 1958

2,844,085

AIR DISTRIBUTION SYSTEM

Victor E. Matulaitis, Franklin, Mich.

Original application July 28, 1949, Serial No. 107,332. Divided and this application September 24, 1951, Serial No. 247,934

9 Claims. (Cl. 98—2)

The present invention relates generally to an air distribution system and more particularly, to heating apparatus for an automobile in which means are provided for dividing heated air and dicharging a portion of the air directly into the body of the vehicle and discharging a second portion of the air against the windshield to effect a defrosting operation.

The present application is a division of my prior copending application Serial No. 107,332, filed July 28, 1949, now Patent No. 2,683,025.

It is an object of the present invention to provide means effective to increase the velocity of the air discharged into the vehicle for general heating purposes as the volume of such air is decreased by diverting a portion of the heated air to defrosters.

More specifically, it is an object of the present invention to provide a car heater-defroster including an opening for discharging air directly into the body of the vehicle for general heating purposes, a passageway for conducting heated air to a defroster, and valve means operable simultaneously to open the passage for heated air to the defrosters and at the same time to partially close the opening for discharging air directly into the body of the vehicle.

Still more specifically, it is an object of the present invention to provide valve means operable to control the flow of air from a heater to a defroster, adapted simultaneously to control the flow of air from the heater directly into the body of the vehicle, in which the valve means is shaped to produce a jet of air, the velocity of which varies inversely as the volume thereof.

Other objects and features of the invention will become apparent as the description proceeds, especially when taken in conjunction with the accompanying drawings, wherein:

Figure 1 is a perspective partial view of a motor vehicle equipped with a heater embodying the present invention.

Figure 2 is an enlarged view of the heater taken substantially along the line 2—2, Figure 1.

Figure 3 is a front elevational view of the heater shown in Figure 2.

Figure 4 is an enlarged broken elevational view of the heat transfer core for the heater shown in Figure 2.

Figure 5 is a view taken substantially along the line 5—5, Figure 4.

Figure 6 is a view taken substantially along the line 6—6, Figure 4.

Figure 7 is a fragmentary view showing a modified form of the heater shown in Figure 2.

Figure 8 is a view similar to Figure 7 showing a further modified form of heater.

Figure 9 is a side elevation of a heater with parts in section illustrating a different arrangement of damper.

Figure 10 is a sectional view through an air exhaust port and associated damper showing a modified construction thereof.

Figure 11 is a view similar to Figure 10 illustrating yet another modified form of air exhaust port and damper.

Figure 12 is a fragmentary vertical section through the lower portion of a heater illustrating a modified form of air exhaust port and damper.

Figure 13 is a fragmentary section on the line 13—13, Figure 12.

Referring now to the drawings, there is illustrated a portion of a motor vehicle 10 having an engine compartment 12, a passenger space 14, windshield portions 16, and a fire wall 18. As is customary, the fire wall 18 is provided with a number of apertures, some of which are shown in Figure 2 at 20 and 22, for mounting a vehicle heater designated generally at 24 and which as shown in Figure 1, extends transversely of the vehicle and substantially completely across the width thereof.

The heater 24 comprises a pair of sheet metal members, one of which, as indicated at 26, is dished and has a peripheral wall closed by a substantially flat sheet metal member 28 to form a box-like casing or housing 30 having adjacent one end thereof an air inlet 32 and a series of downwardly open elongated air discharge openings 34 across the length of the heater. The inlet 32 may be positioned anywhere across the length of the heater 24.

A core indicated generally by the reference numeral 36, is carried within the housing 30 and is connected to an inlet pipe 38 and an outlet pipe 40 for circulating a heating medium therethrough. As is usual in motor vehicles, the heating medium will normally be the coolant for the motor vehicle engine.

The coolant preferably is supplied from the engine 42 through a conduit 44, through a flow-controlling thermostatically operated valve 46 and through conduit 48 to the heater pipe 38. The coolant after flowing through the heat exchange core 36 passes outwardly through the pipe 40 and conduit 50 back to the motor vehicle cooling system, as for example, to the coolant pump 52.

Air for defrosting the windshields 16 is distributed thereto through conduits 54 and 56 and nozzles 58 and 60 respectively. The flow of air to the vehicle for general heating of the passenger space and for defrosting the windshield is controlled by specifically defined valve means which constitute an important part of the present invention and will be described in detail.

However, before referring to the air distribution system further detailed description of the heater structure itself is in order.

The heat exchange core 36 as well illustrated in Figure 2, and as seen in somewhat greater detail in Figures 4, 5 and 6, constitutes a container 62 which as best illustrated in Figure 6, is formed of two generally flat dished elements 64 and 66. The element 66 is provided with flanged openings 68 and 70 for the reception of the pipes 38 and 40 previously referred to. Except for the flanged openings 68 and 70, element 66 is imperforate. The element 66 is provided around its periphery with a flange 72 which in turn connects with a flange 74, the latter occupying a single plane spaced from the plane occupied by the central portion of the element 66. The element 64 is imperforate and is provided at its edge with a flange 76 carrying a second flange 78 which occupies a single plane than the flange 74 and to assemble the elements 64 and 66, spaced from the plane occupied by the central portion of the element 64. The flange 78 is initially of greater extent the edge portion of the flange 78 is clinched over the edge of the flange 74 and soldered or brazed to provide a tight seal.

Preferably, as best indicated in Figure 5, the interior of the container 62 is provided with heat conducting elements 80 defining restricted passageways for the flow of heating liquid through the container and adapted to conduct heat to the outer walls of the container. Attached to the outer walls of the container are further heat transfer structures indicated generally at 82 which may comprise a series of heat conducting sheets bent into generally corrugated formation as illustrated and defining a plurality of relatively small passages for the flow of air therethrough.

The heat exchange core 36, as best illustrated in Figure 2, is secured directly to the inner surface of the casing element 28. In order to channelize the flow of air through the casing, a plate or partition 84 is provided which extends forwardly from the rear wall of the casing into proximity to the rear surface of the heat exchange core 36 and is provided with a flanged seat 86 adapted to carry a rubber or similar sealing element 88 which contacts the rear wall of the heat exchange unit 36. This, together with means later to be described, separates the interior of the casing into an air inlet plenum chamber 90 and an air outlet plenum chamber 92. As best seen in Figure 3, a pair of vertically extending partitions 94 and 96 are provided above partition 84 and which define vertically extending passages 98 and 100 serving to conduct heated air to the conduits 54 and 56 respectively. It will be understood that partition 84 has openings adjacent its ends communicating with passages 98 and 100, or alternatively terminates at said partitions 94 and 96.

The space 102 within the casing directly below the partition 84 constitutes a plenum chamber for discharge of air to the defrosters and communication between the outlet plenum chamber 92 and the defroster plenum chamber 102 is controlled as seen in Figure 2, by a valve 104. The valve 104 as illustrated in full lines in Figure 2, may seat against a resilient valve seat 106 so as to shut off communication between the plenum chambers 92 and 102. The valve 104 however is mounted for rocking movement about a pivot support 108 and may be moved from the full line position illustrated in Figure 2, in which it prevents flow of air from plenum chamber 92 to plenum chamber 102, in a counterclockwise direction, thereby opening a communication between the chambers 92 and 102 and at the same time variably restricting flow from the outlet plenum chamber 92 through the outlet opening 34. Resilient leaf 109 follows valve 104 and prevents air flow from chamber 102 through opening 34.

It is an important aspect of the present invention that the means for controlling the flow of air to the defrosting means also controls the velocity with which the remaining air is discharged into the body of the vehicle for general heating purposes. In the present instance, this is accomplished by providing the valve 104 with a lower portion 110 which lies at one side of the discharge opening 34 when the opening is in its fully open position. As the valve is swung in counterclockwise direction from the full line position illustrated, it variably restricts the area of the opening 34 while at the same time it increases the effective communication between the plenum chambers 92 and 102. It will be observed that the lower edge portion of the valve 104 is located in the opening 34 and that the opening 34 discharges the air directly into the interior of the vehicle without further restrictions or interference with flow. It will also be observed that as the valve portion 110 moves across the opening 34 it presents an increasingly inclined surface which cooperates with the opposite side of the opening 34 to provide a jet of air, the velocity of which will be increased as its volume of flow is reduced.

A comparison of the results obtained with the present invention and with conventional heating systems is of interest. In the conventional design where 129 cubic feet of air per minute are available for heating, air may be discharged into the vehicle at 2550 feet per minute. When the conventional type of heater is adjusted to supply air for defrosting, approximately 50 cubic feet of air per minute are available for defrosting and 50 cubic feet of air per minute are available for heating. This reduction in the quantity of air available for heating results in a decrease in the velocity of air discharged into the vehicle to approximately 900 feet per minute. With the present design, assuming a heater of the same capacity, when heating is carried on alone 129 cubic feet of air per minute are discharged into the interior of the vehicle at a velocity of 2550 feet per minute. When the heater is shifted over to supply air for defrosting, 50 cubic feet of air per minute are supplied to the defroster and 50 cubic feet of air per minute are discharged into the interior of the vehicle, but at an increased velocity of 4030 feet per minute.

It is found that this increase in the velocity of air when its quantity is reduced, produces very desirable results and increases the comfort of the occupants of the vehicle.

Referring now to Figure 7, there is illustrated a modification of the present invention. In this case the defroster plenum chamber 102 is separated from the inlet plenum chamber 90 by a partition 120 having a depending wall 122 separating the defroster plenum chamber 102 from the outlet plenum chamber 92. The wall 122 terminates above the bottom wall of the container to leave an opening 124 affording a passage for flow of air from the outlet plenum chamber 92 to the defroster plenum chamber 102. In this embodiment of the invention a valve device indicated generally at 126 is provided, comprising an upper plate 128 adapted to close the opening 124, and a lower curved plate 130 shaped to conform to one side of the elongated opening or slot 34. The arrangement is such that when the opening 124 is closed, thereby preventing flow of air to the defrosters, the valve portion 130 lies along one side of the opening 34. However, when the valve assembly 126 is moved to the right to the dotted line position, valve element 128 moves away from the lower edge 124 of the partition or wall 122 thereby permitting flow of air into the defroster plenum chamber. At the same time the lower valve part 130 moves into proximity to the opposite wall 132 of the discharge opening 34, thereby providing a variably restricted orifice adapted to produce a jet of high velocity air moving into the interior of the vehicle.

A third embodiment of the invention is illustrated in Figure 8 in which case the air inlet plenum chamber 90 is separated from the defroster plenum chamber 102 by a partition including a transversely horizontal wall 140, a downwardly extending wall portion 142, and a rearwardly inclined wall portion 144. In this case the valve 145 controlling flow of air through the opening 146 between the air outlet plenum chamber 92 and the defroster plenum chamber 102, comprises a plate mounted upon a pivot support 148 and including an inclined portion 150 adapted when moved to the dotted line position to cooperate with the opposite curved side 152 of the air discharge opening 34 to provide a narrowing or tapered discharge orifice designed to produce a high velocity jet of air into the body of the vehicle. The valve 145 is illustrated as carrying a resilient bumper 154 which engages the lower side of the casing 30.

The essential feature of the present invention is in the provision of a discharge opening having a valve element movable therein which is adapted to provide a restricted orifice inducing a high velocity flow of air when the valve is moved to a position to reduce the volume of air flow through the opening. Preferably, and as illustrated in the several embodiments herein, the valve includes portions adapted to control communication between the discharge plenum chamber and the defroster plenum chamber. By this arrangement means are provided which automatically produce a high velocity jet of air into the body of the vehicle whenever some of the air available is diverted for purpose of defrosting the windshield.

Referring now to Figure 9 there is illustrated a somewhat modified construction, the description of which will be limited to the modified features. In the heater illustrated in Figure 9 air flows from the air inlet plenum chamber 160 through the heat exchange core 162 to the air outlet plenum chamber 164. A defroster plenum chamber 166 is normally separated from the air outlet plenum chamber 164 by a valve or damper 168 which is pivoted intermediate its top and bottom edges as indicated at 170. The air outlet plenum chamber is provided with one or more elongated slot-like air exhaust ports 172 adapted to discharge air directly into the interior of the vehicle. In the illustrated position the upper edge of the valve or damper 168 engages an abutment 174 which may be of rubber or the like, and prevents the flow of air from the air outlet plenum chamber to the defroster plenum chamber 166. At this time the lower edge portion 176 of the valve or damper 168 lies close to one side of the opening 172, and accordingly air is permitted to flow substantially freely from the air outlet plenum chamber 164 through the port 172 into the interior of the vehicle.

Within the defroster plenum chamber 166 there is provided a plate-like baffle 178, the upper edge of which preferably is provided with a resilient U-shaped lining element 180 and this in turn rests against the pivot support 170. Baffle 178 may be formed of resilient metal and initially shaped so that in the illustrated position it presses resiliently against the hinge support. When the valve or damper 168 is moved in a clockwise direction from the illustrated position, the upper edge thereof moves away from the abutment or bumper 174 and opens a passage for air to flow from the air outlet plenum chamber 164 into the defroster plenum chamber 166. At the same time the baffle 178 prevents the flow of air from the defroster plenum chamber through the outlet port 172. The lower portion 176 of the valve or damper at this time moves to the left as seen in Figure 9 and restricts the cross-sectional area of the outlet port 172, thus increasing the velocity of the diminished volume of air that flows therethrough.

The heater constructed in accordance with the present invention is provided with one or more, and preferably a plurality, of aligned elongated outlet or discharge ports or openings. It has previously been pointed out that the present invention involves the use of a valve or damper element movable transversely of the elongated discharge opening so as to restrict the cross-sectional area thereof in a manner to increase the velocity of the flow of air therethrough.

Referring now to Figure 10 there is illustrated a modified form of outlet port or opening which has the additional function of concentrating the diminished volume of air into a particular path or zone when the valve or damper moves to the closed position. In this figure, which is a horizontal section through the outlet or discharge opening, the opening comprises an elongated portion 182 which at one end thereof widens into a partially circular port or opening 184. The valve or damper 186 is illustrated in full lines in the open position which permits substantially unrestricted flow of air through the exhaust port or opening comprising the elongated portion 182 and the partially circular portion 184. When a large volume of heating air is available it is desirable to introduce this air into the interior of the vehicle through the elongated port or opening so as to supply the heated air uniformly and to avoid drafts. However, when the volume of air available for heating the interior of the vehicle is substantially reduced, it is in many cases desirable to concentrate the reduced volume of air into particular localities, such for example as zones occupied by the feet of the occupants of the vehicle. With the construction shown in Figure 10, when the valve or damper 186 moves toward the closed position illustrated in dotted lines, flow of air is ultimately concentrated in the partly circular outlet portion 184, which in turn may be located so as to direct a concentrated flow of air to the particular point within the vehicle.

The construction shown in Figure 11 is similar to that shown in Figure 10 except that in this case the outlet port includes an elongated portion 190 and a partly circular or enlarged portion 192, which in this case is located intermediate the ends of the elongated opening 190. Again, the damper or valve 194 is illustrated in full lines in fully open position permitting the air to flow substantially uniformly throughout the length of the elongated discharge opening. However, when the valve or damper 194 is moved to or approaches the closed position illustrated in dotted lines, the reduced volume of air is concentrated into a path as determined by the laterally offset portion 192 of the opening.

Referring now to Figures 12 and 13 there is illustrated an arrangement in which as the valve or damper moves to closed position, the reduced volume of air resulting from the such movement is concentrated into a particular path. In this case the outlet opening indicated generally by the numeral 200, includes one side wall 202 which may be substantially planar and extends in a vertical direction. The opposite side wall 204 of the opening has one or more inwardly open channel portions 206 which extend in the desired direction of air discharge. Thus, as seen in Figure 13, the channel 206 is inclined to the left so that air discharged therefrom will be in the direction of the arrow 207. In Figure 12 the damper 208 is illustrated in full lines as in closed position with respect to the outlet opening 200 and in this position rests against flat wall portion 204, thereby closing off the elongated outlet opening 200 with the exception of the inclined channel portion 206. A baffle 209 similar to baffle 178 in Figure 9, is provided to prevent air flow from the defroster plenum chamber through opening 200.

It will be appreciated that the valve or damper 208 in the dotted line position prevents passage of air from the air outlet plenum chamber 210 to the defroster plenum chamber 212 and that accordingly at this time all of the air flowing into the air outlet plenum chamber is exhausted directly into the interior of the vehicle through the generally elongated outlet port or opening 200. When the valve or damper 208 is moved to the full line position it opens a passage for the flow of air from the outlet plenum chamber 210 to the defroster plenum chamber 212, and at the same time restricts the flow of air through the exhaust opening or port into the interior of the vehicle. At this time a smaller volume of air flows into the interior of the vehicle, but it flows at a greater velocity and in addition, it is concentrated into a restricted path and is in addition controlled directionally by the channel 206. The result is that when a substantial portion of the available air is used for defrosting purposes, the balance of the air is utilized most efficiently and most effectively for heating the interior of the vehicle and for supplying heated air to desired points therein.

The drawings and the foregoing specification constitute a description of the improved heat transfer apparatus in such full, clear, concise and exact terms as to enable any person skilled in the art to practice the invention, the scope of which is indicated by the appended claims.

What I claim as my invention is:

1. A car heater-defroster assembly comprising an air outlet plenum chamber having a downwardly directed discharge opening for directing air directly into the passenger compartment of the car, a defroster plenum chamber at the side of said air outlet plenum chamber, said chambers having an air flow passage therebetween adjacent said discharge opening, means for directing heated air into said outlet plenum chamber, a valve having an upper portion movable in said passage to control air flow therethrough and a lower portion movable across said discharge opening, the upper portion of said valve in one position closing the passage between said chamber and the lower portion of said valve in such position having a lower edge at one side of said discharge opening, the upper portion of said valve being movable to open said passage as the lower edge of said valve moves across said discharge opening to restrict air flow therethrough, the lower portion of said valve being inclined to the flow of air in all positions in which it restricts flow of air out of said discharge opening to increase the velocity as the volume of flow is decreased.

2. A forced air space heater comprising a casing into which heated air is supplied under pressure, said casing having a generally elongated slot opening directly into the space to be heated, a damper movable tranversely of the slot to variably restrict the flow of heated air from said casing to the space to be heated and to increase the velocity of discharged air as the volume of such air is decreased, the side of the slot toward which said damper moves in decreasing the volume of air discharged having a restricted offset recess so that when said damper approaches said side of the slot, the flow of air is concentrated in the zone defined by the recess and the adjacent edge of the damper.

3. An automobile heater comprising a casing, a heat exchange core in said casing, partition means associated with said casing and core separating said casing into an upper air inlet plenum chamber and a lower air outlet plenum chamber, means for supplying a flow of air to said inlet plenum chamber, said air outlet plenum chamber having an elongated downwardly directed air discharge opening which opens directly into the space to be heated, a valve in said casing located at one side of said discharge opening and having a portion in said discharge opening movable toward and away from the other side of said opening to variably restrict the flow of air through said opening and to define with said one side of the opening a restricted port through which air flows directly into said space, said casing comprising a wall portion at the other side of said opening, said valve being provided with pivot means located above said discharge opening, and the portion of said valve in said discharge opening being inclined downwardly toward one side of said discharge opening to define a tapered nozzle with said wall portion as it is moved toward said one side.

4. A heater as defined in claim 3 in which said wall portion is inclined downwardly and inwardly toward said portion of said valve.

5. A heater as defined in claim 3 in which said casing has a passage connected with said air outlet plenum chamber, said valve including a portion controlling the flow of air into said passage and disposed to open said passage to the flow of air as said discharge opening is restricted.

6. A car heater comprising an elongated casing shaped to extend across the major portion of the width of the car, a heat exchange core within said casing extending substantially the full length thereof and having vertical air passages therethrough, horizontal partition means within said casing cooperating with said core to divide the interior of said casing into upper and lower portions, said horizontal partition means having openings therethrough adjacent its ends, vertical partition within said casing above said horizontal partition means and located inwardly from the ends thereof beyond said openings dividing the upper portion of said casing into a pair of vertical defroster passages and an air inlet plenum chamber therebetween, said casing having openings therein for admitting air to said air inlet plenum chamber and for discharging air from said defroster passages, said casing having downwardly open air discharge openings beneath said core, a generally vertically extending valve plate hingedly mounted in said casing below said horizontal partition means and having an upper edge movable toward and away from said core and a lower edge movable across said air discharge openings, said valve plate dividing the lower portion of said casing into an air outet plenum chamber communicating with said air discharge openings and a defroster plenum chamber communicating with the lower ends of said defroster passages, said valve plate being movable from a first position in which its upper edge abuts the lower portion of said core to close said defroster plenum chamber from said air outlet plenum chamber and its lower edge provides a minimum restriction to flow of air out of said air outlet plenum chamber through said air discharge openings, to other positions in which its upper edge is spaced from the lower portion of said core to provide communication between said air outlet and defroster plenum chambers and its lower edge restricts flow of air out of said air outlet plenum chamber through said air discharge openings, said valve plate in said other positions providing for increased velocity of air flow through said air discharge openings.

7. A car heater-defroster assembly comprising a casing having an air outlet plenum chamber having a downwardly directed elongated discharge opening for directing air directly into the passenger compartment of the car, a defroster plenum chamber at the side of said air outlet plenum chamber, a passage between said chambers adjacent said discharge opening, and valve means in said casing movable to variably restrict said discharge opening and simultaneously to variably open said passage, said valve means including a portion located at said discharge opening movable toward and away from one side wall thereof, the said portion of said valve means and the said one side wall being shaped to define an outwardly tapered nozzle at said discharge opening in all positions in which said valve means restricts flow of air therethrough.

8. An automobile heater comprising a casing having an elongated discharge opening therein defined at one side by a wall portion extending generally perpendicular to the opening, a valve plate in said opening movable toward and away from said wall portion respectively to close and open said opening, said wall portion having an open ended channel open inwardly of said opening and cooperable with said valve to define a nozzle for controlling the direction of discharge of air when said valve is moved into proximity to said wall portion.

9. Structure as defined in claim 8 in which said channel is disposed obliquely with respect to said opening to provide a concentrated flow of air in a direction from the flow through said opening when said valve is in proximity to said wall portion.

References Cited in the file of this patent

UNITED STATES PATENTS

| | | |
|---|---|---|
| 1,966,882 | Bucklen | July 17, 1934 |
| 2,012,179 | Ashley | Aug. 20, 1935 |
| 2,188,388 | Butterfield | Jan. 30, 1940 |
| 2,214,165 | Fink | Sept. 10, 1940 |
| 2,225,071 | Mayerhoefer | Dec. 17, 1940 |
| 2,268,478 | Fehrer | Dec. 30, 1941 |
| 2,295,146 | Welch | Sept. 8, 1942 |
| 2,319,002 | Kramer | May 11, 1943 |
| 2,430,335 | Hart | Nov. 4, 1947 |
| 2,518,356 | Mieras et al. | Aug. 8, 1950 |
| 2,532,882 | Beatty | Dec. 5, 1950 |
| 2,537,315 | Newton | Jan. 9, 1951 |
| 2,640,409 | Hans | June 2, 1953 |

FOREIGN PATENTS

| | | |
|---|---|---|
| 521,507 | Great Britain | May 23, 1940 |
| 523,447 | Great Britain | July 15, 1940 |